June 23, 1942.  H. G. BUSIGNIES ET AL  2,287,166
DEVICE FOR ASSISTING NAVIGATION
Filed May 17, 1939  2 Sheets-Sheet 1

Inventors
H. G. Busignies
L. C. Gallant
P. L. Bour
by
Attorney

Fig. 2.
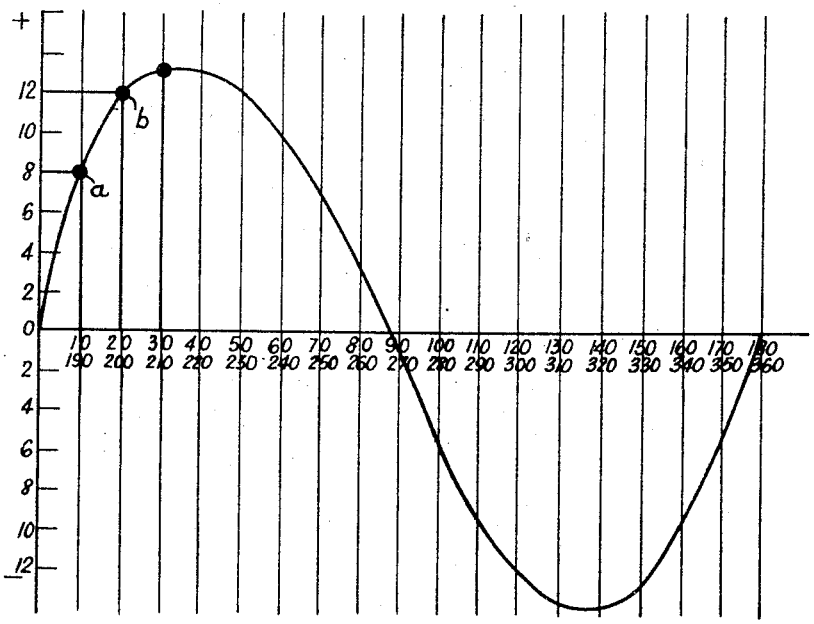
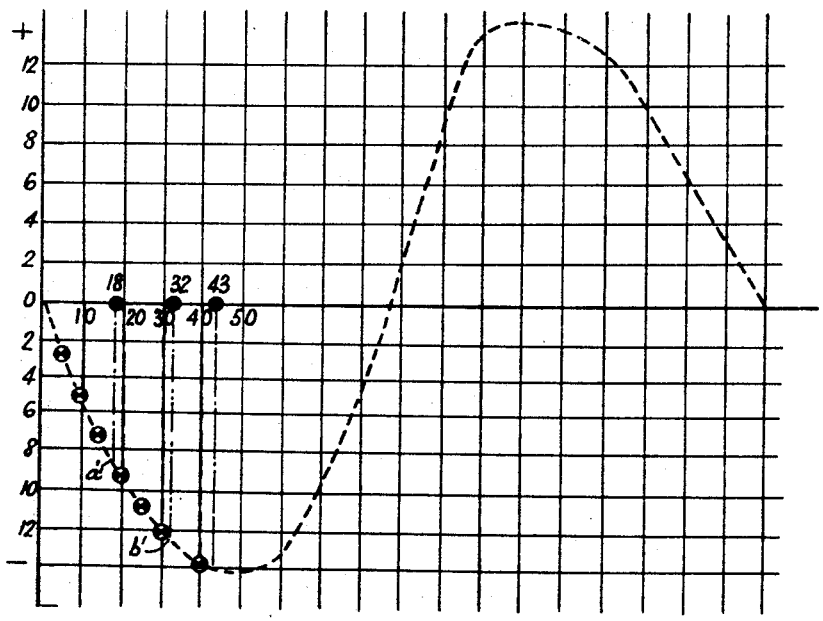
Fig. 3.

Patented June 23, 1942

2,287,166

UNITED STATES PATENT OFFICE 2,287,166

DEVICE FOR ASSISTING NAVIGATION

Henri Gaston Busignies, Louis Charles Gallant, and Paul Lucien Bour, Paris, France, assignors to International Standard Electric Corporation, New York, N. Y.

Application May 17, 1939, Serial No. 274,148
In France June 2, 1938

2 Claims. (Cl. 235—61)

The present invention relates to calculating devices for direction finders e. g. radio goniometer system.

A radio-goniometer system employed for navigation has certain imperfections of operation peculiar to it, due to relative influences between said system and its surroundings. The best known and most tiresome of these operative imperfections is that known by the name of quadrantal error which is due to the presence of metallic masses which occur in the vicinity of the radio-goniometer when it is mounted e. g. on an aeroplane. The bearings obtained by the radio-goniometer and employed in the associated calculating device are impaired by errors due to this characteristic fault of the apparatus. The invention has as one of its objects the provision of means for eliminating such errors.

According to the invention, a calculating device for direction finders comprises three independently rotatable members (two discs and an annulus) bearing respectively a scale of geographic meridians, a scale of magnetic meridians and a scale of radio-goniometric bearings, a cursor arm for reading the true bearings and secured to the disc bearing, the scale of radio-goniometric bearings, and an independently movable assembly arranged to compensate for errors particular to the radio-goniometer arrangement with which the calculating device is intended to be used.

An embodiment of the invention will now be described in detail in the following description referring to the attached drawings comprising Figs. 1 to 3 in which:

Figs. 2 and 3 show an example of curves employed in order to determine the profile of the cam of the calculating device of Fig. 1.

Figure 1:
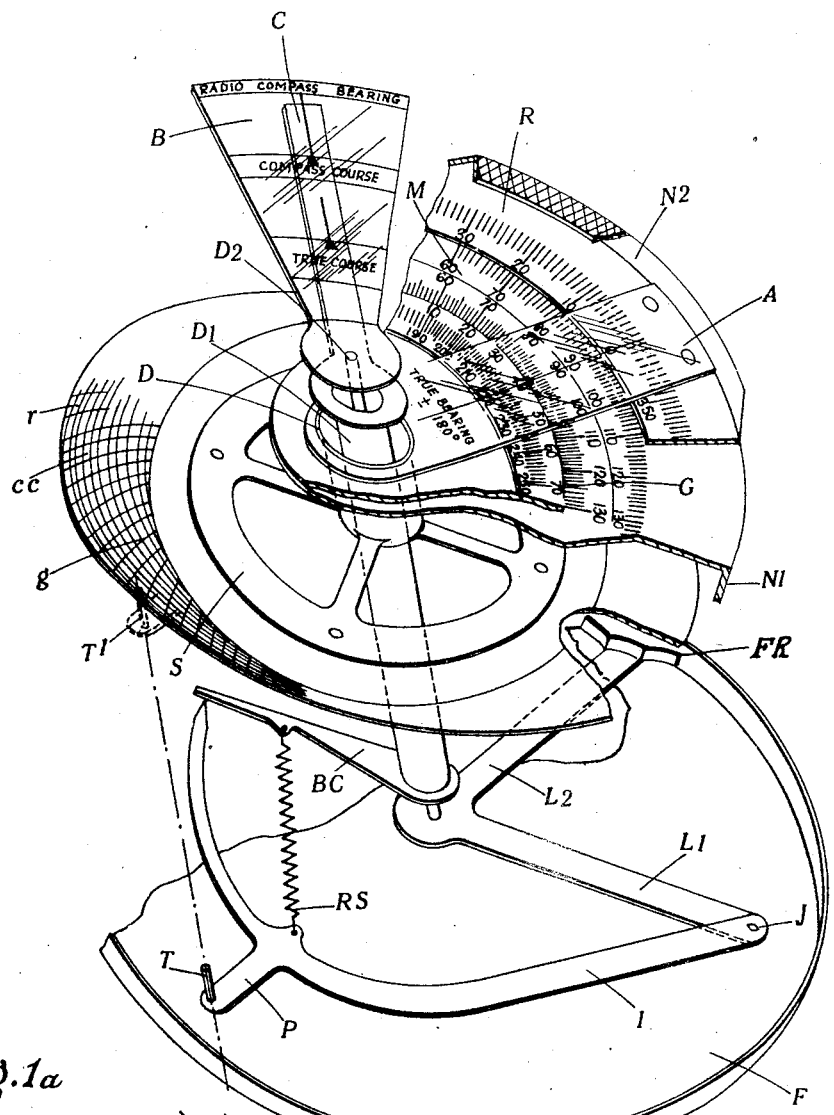
Fig. 1 shows in perspective with broken away portions and with the various elements spaced along the axis of the device a calculating device according to the invention for use in association with a radio-goniometric direction finder.

The calculating device of Fig. 1 comprises two concentric discs and an annulus forming the front surface of the calculating device; these are respectively indicated as at G for the disc of the geographical meridians, M for the disc of the magnetic meridians and R for the annulus of the radio-goniometric bearings.

The geographic disc G may comprise two sets of circular graduations from 0–360° progressing in the same direction, that is clockwise in the drawings, the two sets of graduations being displaced by 180° with respect to each other. This disc is preferably rotatably adjusted with respect to the support of the calculating device, if desired, which may be considered as member F and disc M. The outside set of graduations is arranged to represent the geographic meridians and to permit a transparent radial moving arm B to be oriented in accordance with the true angle of route followed by the machine. The two sets of graduations read simultaneously on a transparent arm A associated with the disc M, give true radio-goniometric bearings with the tolerance of + or − 180°.

The magnetic disc M comprises on the outside a circular set of graduations from 0–360° progressing clockwise in the drawings giving the magnetic meridians. This magnetic disc M is provided with a cylindrical flange NI directed towards the bottom of the casing F having a cylindrical flange N directed in the opposite direction. The radio-goniometric annulus R is provided with a flange N2 and has a circular set of graduations from 0–360° progressing anticlockwise. On the zero of this set of graduations is fixed arm A giving the reading of the final results sought which gives the true bearing of the radio transmitting stations, or its bearing with respect to the magnetic north.

The radio-goniometric annulus R is carried by means of the arm A by a sleeve shaft D provided with a wheel S on which is fixed a correcting cam CC described in more detail later in the description. This cam is engaged by a pin T which normally follows its contour, as indicated in dotted lines at T'. The pin T is attached to the end of a supporting arm P projecting from a bent lever I pivoted at J on one end of a two-armed lever LI, L2 fixed on the axle D2 of the moving arm B. Consequently, the unit L2, LI, I, P, T is displaced with the arm B when the position of the latter is modified. The pin T follows the contour of the cam CC, this movement being permitted by an elastic connection between the lever I and a correcting arm BC, e. g. by the spring RS. The correcting lever BC is fixed to a sleeve DI on which is also fixed the correcting arm C. The arm L2 is provided at its outer end with a brake in the form of a spring FR which engages the inside of the cylindrical flange N.

Any displacement of the radio-goniometric annulus R will entail a displacement of the wheel S and cam CC which, by acting on the pin T displaces the levers I, L1 and BC, produces a corresponding displacement of the arm C with respect to the moving arm B. Any displacement of the moving arm B will entail by the flexible connection RS a corresponding displacement of the arm C.

In order to use the calculating device the geographic disc G and magnetic disc M are adjusted in position relative to one another, taking into consideration the declination, the sign and the value of the magnetic variation of the locality, so that disc G indicates the true geographic meridians while disc M indicates the magnetic compass meridians. This adjustment involves displacing the disc G with respect to disc M to correct for the magnetic deviation for the particular locality. The arm B is then manipulated in order to bring the pointer labelled "True course" immediately above the geographical course adopted or to be followed, without taking into consideration the displacements of the arm C during this operation. The pointer labelled "Compass course" on the arm B will then indicate to the pilot the course to keep by the magnetic compass. These elements once adjusted are held in place by friction and brakes FR and should only be modified afterwards for changes of course of the machine or changes of the magnetic variation.

When taking a bearing on a transmitting station by radio compass, the pilot notes the reading of the bearing as given by the radio compass, and then moves the annulus R until the graduation on R corresponding to the radio compass reading is in line with the cursor on arm C. For example, assume that the radio compass bearing is 30°, the pilot will then move annulus R until the 30° line on the annulus comes in line with the cursor on arm C (and not in line with the pointer on arm B). Rotation of annulus R causes rotation of wheel S and the correcting cam CC. Cam follower T operates through lever BC to turn arm C in accordance with the contour of the cam and applies the proper correction to the arm C to correct for the quadrantal error of the radio compass. When the device is set in this manner the true bearing of the radio station is indicated on the scale G beneath the index line on the arm A, and the magnetic compass bearing of the radio station is indicated on the scale M beneath the index line on the arm A.

The cam CC should be cut out to agree with the particular direction-finder with which the calculating device is to be used. In the case of an aeroplane for example, there is a certain distribution of the metallic masses and, consequently, of the quadrantal error on a complete circumference. The plotting of the cam CC will be determined consequently for each special case at the time of determining the quadrantal error peculiar to the machine. One of the classical methods of determining this error in calibration of the direction-finder consists in marking the true bearing of a radio-goniometer station on the theodolite and the bearing of this station given by the radio-goniometer for various orientations of the aeroplane (for example, from 10° to 10° successively). The curve of quadrantal error on the radio-goniometer is then plotted. An example of such a curve of error is given in Fig. 2, the true bearings being plotted as abscissae and the differences between the true bearings and the bearings of the radio compass as ordinates.

The curve to be marked on the printed or engraved diagram on the cam CC, or on a tracing, which will then be stuck on the cam CC not cut off, that is to say, appearing as a disc formed of a plurality of equidistant circles such as r, and of equiangular curves such as g, Fig. 1, may be calculated from the curve of Fig. 2 or from a table giving the true bearing, the radio-goniometric bearings and the differences between these bearings. Fig. 3 gives the curve to be marked on the cam disc to determine its outline in accordance with which the disc is to be cut in the case in which the curve of error obtained for the radio-goniometer is that of Fig. 2. The axis of the curve of Fig. 3 is marked with the radio-goniometric bearings and for each value of the radio-goniometric bearings given by the algebraical sum of an ordinate and of a corresponding abscissa of the curve of Fig. 2, there will be plotted as ordinate the corresponding value of the ordinate of Fig. 2, but with the opposite sign. Each ordinate value in Fig. 2 is plotted in Fig. 3 at an abscissa point equal to the algebraic sum of the ordinate and the corresponding abscissa in Fig. 2. For example, the point a in Fig. 2 has an ordinate of 8 and since this point lies on the 10 degree line, this ordinate will be plotted on the 18 degree line in Fig. 3, as shown at a'. In like manner, the ordinate 12 for point b in Fig. 2 will be plotted on the 32 degree line in Fig. 3 as shown at b'.

Figure 1A:
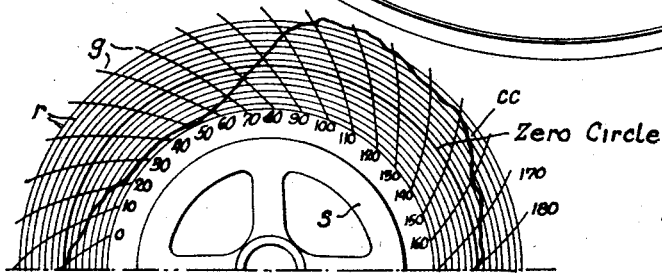
Figure 1a is a diagram showing the manner in which the contour curve for the cam is developed on the cam disc only one-half of the cam disc being shown.

The curve as obtained in Fig. 3 is transferred to the cam disc as shown at CC in Figure 1a where the circular lines r correspond to the horizontal ordinate lines of Fig. 3, and the curved lines g correspond to the vertical abscissa lines in Fig. 3. The lines g are spaced 10 degrees apart and are formed on a radius equal to the distance between the pivot J and the pin T. In other words, lines g represent the paths of travel of pin T for each 10 degree position of the disc. After curve CC is plotted on the disc, the cam is cut out and set in place and the calculating device is then ready to be used with the particular radio-goniometer for which the cam has been cut out.

The rear surface of the moisture proof and dust proof casing N of the calculating device can, be employed to carry tables of co-efficients arranged for example in series of concentric circles, giving, as functions of the angles of two successive bearings, co-efficients defining the ratio of the distance traversed by the machine (as ascertained by chronometer and speed indicator) to the distance of the machine from the station marked to the second bearing. In the centre is placed a circular calculating rule, permitting one to obtain rapidly by a single operation the distance of the machine from the transmitting station, by utilising the distance travelled and the co-efficients inscribed in front of the radio-goniometric bearings.

What is claimed is:

1. A calculating device for radio direction finders comprising a rotatable disc bearing a scale of geographic meridians, a rotatable annulus carrying a scale of radio goniometric bearings, said scales being concentrically arranged, a first cursor arm secured to said annulus and cooperating with said disc for indicating the true goniometric bearings, a second cursor arm rotatably adjustable over said scales for indicating the geographical course to be followed, and a third cursor arm rotatable over said scale, and means for causing relative displacement between said second and third cursor arms upon rotation of said first cursor arm to compensate for errors peculiar to the radio goniometer arrangement with which the calculating device is to be used.

2. A calculating device according to claim 1 wherein said last named means comprises a cam of predetermined shape mounted for rotation with said first cursor arm, an adjustable arm connected at one end to said second cursor arm for adjustment therewith, a curved arm pivotally mounted on the other end of said adjustable arm, a cam follower mounted on said curved arm for cooperation with said cam, a rotatable arm secured at one end to said third cursor arm for movement therewith and bearing against said curved arm at its other end, and an elastic link between said curved arm and said rotatable arm for holding them in contact.

HENRI GASTON BUSIGNIES.
LOUIS CHARLES GALLANT.
PAUL LUCIEN BOUR.